US011905186B2

(12) United States Patent
Hines

(10) Patent No.: US 11,905,186 B2
(45) Date of Patent: Feb. 20, 2024

(54) CRYO-THERMAL DESALINATOR

(71) Applicant: Garold Paul Hines, Fernley, NV (US)

(72) Inventor: Garold Paul Hines, Fernley, NV (US)

(73) Assignee: Garold Paul Hines, Fernley, NV (US)

( * ) Notice: Subject to any disclaimer, the term of this patent is extended or adjusted under 35 U.S.C. 154(b) by 437 days.

(21) Appl. No.: 17/180,562

(22) Filed: Feb. 19, 2021

(65) Prior Publication Data
US 2021/0261438 A1 Aug. 26, 2021

Related U.S. Application Data

(60) Provisional application No. 63/100,062, filed on Feb. 25, 2020.

(51) Int. Cl.
C02F 1/22 (2023.01)
C02F 1/04 (2023.01)
B01D 1/00 (2006.01)
B01D 5/00 (2006.01)
F25D 31/00 (2006.01)
C02F 103/08 (2006.01)

(52) U.S. Cl.
CPC .............. *C02F 1/22* (2013.01); *B01D 1/0041* (2013.01); *B01D 5/006* (2013.01); *B01D 5/0075* (2013.01); *C02F 1/043* (2013.01); *F25D 31/00* (2013.01); *C02F 2103/08* (2013.01); *C02F 2303/10* (2013.01)

(58) Field of Classification Search
CPC ........ C02F 1/22; C02F 1/043; C02F 2103/08; C02F 2303/10; B01D 1/0041; B01D 5/006; B01D 5/0075; F25D 31/00; Y02A 20/00; Y02A 20/124; Y02W 10/30
See application file for complete search history.

(56) References Cited

U.S. PATENT DOCUMENTS

2013/0134102 A1* 5/2013 Buchsbaum .............. C02F 1/22
210/703

* cited by examiner

*Primary Examiner* — Elizabeth J Martin
*Assistant Examiner* — Dario Antonio Deleon

(57) ABSTRACT

The Cryo-Thermo Desalinator (CTD) is a "fire and ice" approach to potability and water reuse using liquid natural gas (LNG) for systemic fuel and cooling. The upstream key heat exchanger (HX) uses LNG to differentiate raw water into pretreated ice melt and cryo-brine blowdown. Ice melt-diluted raw water is primarily sent to the mid-stream key HX condenser where it and LNG tube bundles collapse water vapor into potable water. The downstream key HX uses LNG to separate cryo-brine and thermo-brine into heavy brine and skimmed saline ice which is reinjected into pretreated raw water for maximum corrosion and scaling dilution and extra potability. Heavy brine discharge is more easily dewatered for mining salts, mineral and elements. Pressurized LNG, becoming high pressure natural gas, adds desirable latent heat of vaporization to downstream gas users, including the integrated CCGT/HRSG and is roughly-proportional to thirsty residential/industrial gas users which the CTD serves.

20 Claims, 6 Drawing Sheets

CRYO-THERMAL DESALINATOR

CROSS-REFERENCE TO RELATED APPLICATIONS

This application claims benefit of priority under 35 U.S.C. section 119(e) of the U.S. Provisional Patent Application Ser. No. 63/100,062, filed Feb. 25, 2020, entitled "Cryo-Thermal Desalinator V", which is hereby incorporated by reference in its entirety.

TECHNICAL FIELD

The present disclosure relates, generally, to a desalination system and more particularly relates to a thermal and freeze desalination system for extracting potable water from raw water by utilizing liquefied natural gas as a cryo-condensation medium and thermal fuel.

BACKGROUND

Water shortage is a serious matter in certain regions of the world. For example, the Middle East has hardly any groundwater or freshwater sources and, as such, relies on desalination, which is a process of purifying saline or brackish water into potable water. However, traditional desalination solutions require a lot of energy, infrastructure, and operations that are costly and inefficient. The present invention addresses these limitations in the prior art.

SUMMARY

In accordance with one embodiment of the present disclosure, a desalination system for extracting a potable water from a raw water is provided. The desalination system includes a source of liquid natural gas and a first heat exchanger adapted to receive the liquid natural gas from the source and facilitates a heat transfer between the liquid natural gas and the raw water to convert the raw water into an icy pretreated raw water and a cryo-brine. The desalination system further includes a second heat exchanger fluidly connected to the first heat exchanger and adapted to receive the icy pretreated raw water discharged by the first heat exchanger and adapted to facilitate heat exchange between the pretreated raw water and a waste heat provided by steam/feedwater from a combined cycle power plant to heat the pretreated raw water. The desalination system further includes a third heat exchanger for final heating of a warmed pretreated raw water and to convert the warmed pretreated raw water into a mixture of water vapors and hot pretreated water. The desalination system further includes a fourth heat exchanger configured to receive the liquid natural gas from the source and the mixture of hot pretreated water and water vapors from the third heat exchanger. The fourth heat exchanger facilitates a heat transfer between the mixture of hot pretreated water and water vapors derived from warmed pretreated raw water and the liquid natural gas plus cooled pretreated raw water to facilitate a condensation of the water vapors into the potable water and a conversion of the hot pretreated water into a thermo-brine.

In an embodiment, the desalination system further includes a fifth heat exchanger to treat the thermo-brine and cryo-brine received from the fourth heat exchanger and the first heat exchanger into dense brine and saline ice.

In accordance with another embodiment of the present disclosure, a method for extracting a potable water from a raw water is disclosed. The method includes cooling, by the first heat exchanger, some raw water using liquid natural gas and converting the raw water into an icy pretreated raw water and cryo-brine. The method further includes preheating, by the second heat exchanger, the pretreated raw water discharged by the first heat exchanger by using steam discharged by a combined cycle power plant and converting the steam/feedwater into feedwater being provided to the combined cycle power plant. The method further includes heating, by a third heat exchanger, warmed pretreated raw water received from the second and fourth heat exchanger and converting the warmed pretreated raw waters into a mixture of water vapors and hot pretreated water. The method furthermore includes cooling, by the fourth heat exchanger, the mixture of water vapors and hot pretreated water by utilizing liquid natural gas and cool pretreated raw water from the first heat exchanger. The water vapors are condensed into the potable water and the hot pretreated water is converted into a thermo-brine in response to the cooling of the mixture of water vapors and hot pretreated water.

In an embodiment, the method further includes treating, by the fifth heat exchanger, of the thermo-brine and the cryo-brine received from the fourth heat exchanger and first heat exchanger and converting the thermo-brine and the cryo-brine into dense brine separated from saline ice.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, apparatus and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like referenced numerals refer to like referenced elements throughout. The use of any term should not be taken to limit the spirit and scope of embodiments of the present invention.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Figure 1:
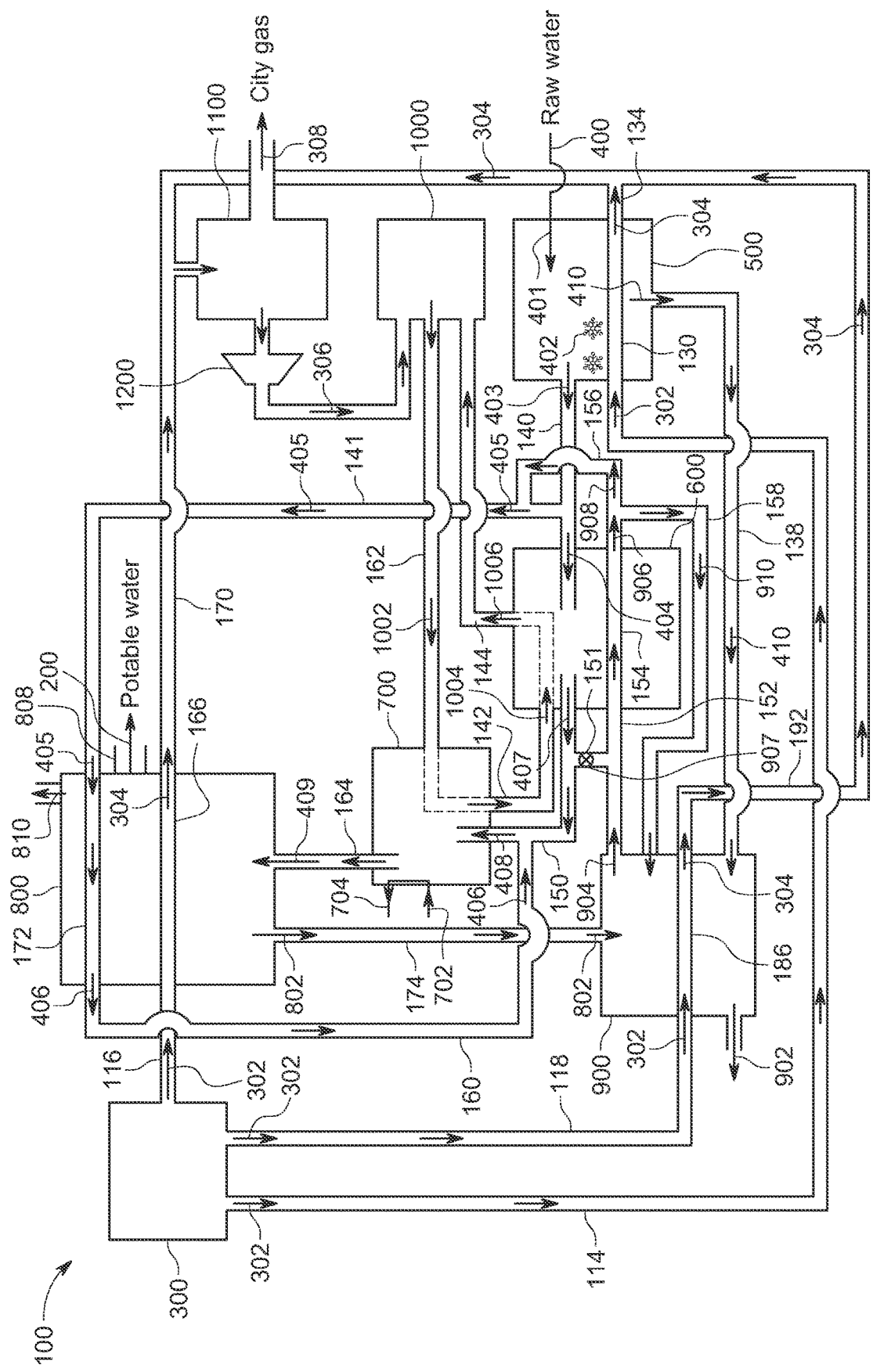
FIG. 1 illustrates a schematic diagram of an exemplary desalination system in fluid communication with a combine cycle power plant, in accordance with an embodiment of the disclosure.

Referring to FIG. 1, a desalination system 100 suitable for extracting a potable water 200 from a raw water 400 and converting liquid natural gas (LNG) 302 to gasified natural gas 304, collected in a natural gas manifold 1100. The desalination system 100 may include a liquid natural gas source 300 of LNG 302, a first heat exchanger 500, a second heat exchanger 600, a third heat exchanger 700, a fourth heat exchanger 800, and a fifth heat exchanger 900. The liquid natural gas (LNG) source 300 may be a reservoir adapted to cryogenically store the LNG 302 and is fluidly connected to the first heat exchanger 500, the fourth heat exchanger 800, and the fifth heat exchanger 900, and delivers a supply of liquid natural gas 302 to the first heat exchanger 500, the fourth heat exchanger 800, and the fifth heat exchanger 900. As shown, the desalination system 100 includes a first conduit 114 to facilitate a supply or flow of LNG 302 from the source 300 to the first heat exchanger 500, a second conduit 116 to facilitate a flow of the LNG 302 from the source 300 to the fourth heat exchanger 800, and a third conduit 118 to facilitate a supply a flow of the LNG 302 from the source 300 to the fifth heat exchanger 900. Also, the desalination system 100 (i.e. the third heat exchanger 700 and the second heat exchanger 600) is adapted to receive steam 1002 discharged by a combined cycle power plant/heat recovery steam generator (CCGT/HRSG) 1000 (hereinafter referred to as power plant 1000).

Figure 2:
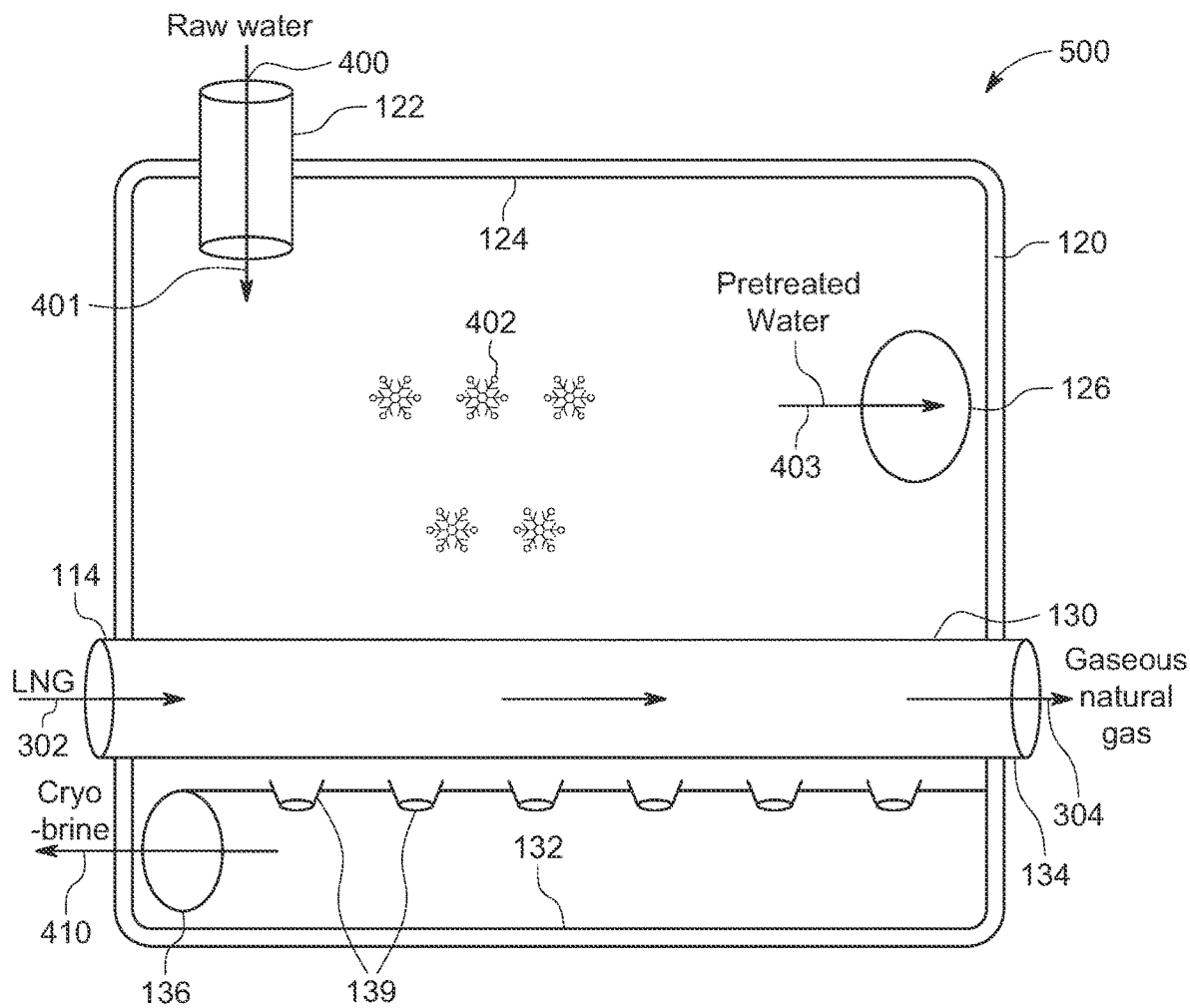
FIG. 2 illustrates a schematic view of a first heat exchanger of the desalination system of FIG. 1 depicting an internal arrangement of the first heat exchanger, in accordance with an embodiment of the disclosure.

The first heat exchanger 500 may be a shell and tube type heat exchanger, and receives and accumulates the raw water 400. The raw water 400 flows into a shell of the first heat exchanger 500 as a raw water 401, while the liquid natural gas 302 flows through an LNG tube of the first heat exchanger 500. The first heat exchanger 500 facilitates a heat exchange between the raw water 401 surging inside the shell and the LNG 302 flowing through the LNG tube to process the raw water 401. Accordingly, the first heat exchanger 500 facilitates in conversion of a minority of the raw water 401 that is in contact with the LNG tube into an ice water 402 (FIG. 2) and a cryo-brine 410. The ice water 402 so formed near the bottom of the shell is freely mixed with raw water 401 to form a pretreated raw water 403, while the cryo-brine gravitationally escapes the raw water 401, and is accumulated near a bottom of the shell to form the cryo-brine 410. The pretreated raw water 403 containing ice water 402 so formed has lesser mineral content that is separated from the cryo-brine 410 which has relatively higher mineral content. Referring to FIG. 2, an exemplary structure of the first heat exchanger 500 is shown. As shown, the first heat exchanger 500 includes the shell 120 having an inlet pipe 122 arranged at a top 124 of the shell 120 to facilitate an entry of the raw water 401 inside the shell 120, and a first outlet port 126 for facilitating an exit of the pretreated raw water 403 from the shell 120 to pipe 140. In an embodiment, the raw water 400 may be groundwater, seawater, river water or industrial wastewater. Further, the LNG tube 130 of the first heat exchanger 500 may be disposed inside the shell 120 and arranged proximate to a bottom portion 132 of the shell 120. As shown in FIG. 1, the tube 130 is connected to the first conduit 114 to receive the supply of liquid natural gas 302 from the source 300, and facilitates a transfer of heat between the raw water 401 present inside the shell 120 and the liquid natural gas 302 flowing through the tube 130 and converts the liquid natural gas 302 to the gaseous natural gas flow 304.

Due to the exchange of heat between the raw water 401 and the LNG 302 flowing inside the tube 130, a lesser amount of the raw water 401 disposed in contact with tube 130 gets converted into the cryo-brine, resulting in an increase in minerals in the raw water 401 present near the bottom portion 132, thereby forming the cryo-brine 410 inside the first heat exchanger 500. Also, the ice formed along the tube 130 may get separated/melted from the tube 130 and may move upwardly, resulting into the combined formation of the pretreated raw water 403 having relatively less mineral content and having a temperature lesser than the raw water 401 entering the first heat exchanger 500. Also, supply LNG 302 absorbs heat from the raw water 401 as the LNG 302 flows through the tube 130 and exits the tube 130 as gaseous natural gas 304. Further, the tube 130 is connected to a first flow line 134 disposed outside the shell 120 and adapted to receive the gaseous natural gas 304 from the tube 130. The first flow line 134 is further connected to the natural gas manifold 1100 to facilitate a delivery of the gaseous natural gas 304 received from the first heat exchanger 500 to the natural gas manifold 1100.

Moreover, as shown in FIG. 2, the shell 120 may include a second outlet port 136 disposed proximate to the bottom portion 132 of the shell 120 and located between the tube 130 and the bottom portion 132. The second outlet port 136 facilitates an exit of the cryo-brine 410, collected at the bottom portion 132 of the shell 120, from the first heat exchanger 500. Further, the second outlet port 136 may be fluidly connected to the fifth heat exchanger 900 via a first brine conduit 138 (shown in FIG. 1) to facilitate a flow the cryo-brine 410 from the first heat exchanger 500 to the fifth heat exchanger 900 for further processing. In some embodiments, the first heat exchanger 500 may include a plurality of baffles 139 disposed inside the shell 120 and the located between the LNG tube 130 and the bottom portion 132. The baffles 139 may cause a generation of downward eddies inside the shell 120, thereby facilitating removal of cryo-brine 410 from the first heat exchanger 500 through the second outlet 136. In addition, the first heat exchanger 500 is connected to the second heat exchanger 600 via a first pipe 140 (FIG. 1) to facilitate a flow of at least a portion of the pretreated raw water 403 from the first heat exchanger 500 to the second heat exchanger 600. In some implementations, a majority portion of the pretreated raw water 403 flowing through the first pipe 140 may be diverted to the fourth heat exchanger 800 via a second pipe 141. The portion of the pretreated raw water 403 flowing to the second heat exchanger 600 may be referred to as the minority pretreated raw water 404, while the majority portion of the pretreated raw water 403 flowing to the fourth heat exchanger 800 may be referred to as the pretreated raw water 405.

Again referring to FIG. 1, the second heat exchanger 600 is adapted to facilitate a preheating of the cooled pretreated raw water 404 received from the first heat exchanger 500 via the first pipe 140. In an embodiment, the second heat exchanger 600 facilitates the preheating of the pretreated raw water 404 by enabling a heat transfer between the pretreated raw water 404 flowing through the second heat exchanger 600 and steam/feedwater 1004 discharged by third heat exchanger 700. As can be seen from FIG. 1, the steam 1002 discharged by the power plant 1000 first enters the third heat exchanger 700, and then enters the second heat exchanger 600 as the steam/feedwater 1004 and exchanges heat with the pretreated raw water 404. In so doing, the pretreated raw water 404 gets heated and leaves the second heat exchanger 600 as warmed pretreated raw water 407 having a relatively higher temperature than the pretreated raw water 404, while the steam/feedwater 1004 gets converted into a cooler feedwater 1006 that is supplied back to the power plant 1000, where feedwater 1006 is reheated by the CCGT/HRSG power production process to become 1002 waste heat.

In an embodiment, the second heat exchanger 600 may receive the steam/feedwater 1004 from the third heat exchanger 700 via a second steam inlet line 142, and may deliver the cooled feedwater 1006 back to the power plant 1000 via a first steam outlet line 144. The warmed pretreated raw water 407 leaving the second heat exchanger 600 enters the third heat exchanger 700 via a third pipe 150. In an embodiment, the second heat exchanger 600 may be fluidly connected to the fifth heat exchanger 900 via a fourth pipe 152 to receive a saline ice 904 from the fifth heat exchanger 900 and facilitates a heating/melting of the saline ice 904. As shown, the second heat exchanger 600 may include a saline ice melt conduit 154 connected to the fourth pipe 152 to facilitate a flow of the saline ice 904 inside the second heat exchanger 600. The saline ice 904 may melt due to a heat exchange between the saline ice 904 and the feedwater 1004. Due to the heat exchange between the saline ice 904 and the feedwater 1004, the saline ice 904 gets melted and exits the second heat exchanger 600 as a saline ice melt 906.

In an embodiment, a majority portion of the saline ice melt 906 may be diverted to the second pipe 141 as saline ice melt 908 via a first outlet pipe 156, which then enters the fourth heat exchanger 800 along with the pretreated raw water 405. A smaller portion of the saline ice melt 906 is diverted back to the fifth heat exchanger via a second outlet pipe 158 as saline ice melt 910. Also, in an embodiment, a pipe 151 may connect the fourth pipe 152 to the third pipe 150 to facilitate a direct flow of a portion of saline ice 904 to the third pipe 150. Further, a bypass valve 907 may control amount of flow of the saline ice 904 to the third pipe 150, thus managing flow of the saline ice 904 to the third heat exchanger 700.

Also, the pretreated raw water 405 and the saline ice melt 908 get preheated as they pass through the fourth heat exchanger 900 and leave the fourth heat exchanger 800 as a warmed pretreated raw water 406 and enter the third pipe 150 via a third outlet pipe 160. The warmed pretreated raw water 406 gets mixed with the warmed pretreated raw water 407 inside third pipe 150, and subsequently enters the third heat exchanger 700. In this manner, a mixture of the warmed pretreated raw water 406 and the warmed pretreated raw water 407 enters the third heat exchanger 700 via the third pipe 150. It may be appreciated that the mixture of the warmed pretreated raw water 406 and the warmed pretreated raw water 407 may be referred to as the pretreated mixture 408.

The third heat exchanger 700 may be a shell and tube type heat exchanger, and facilitates a heating of the warmed pretreated raw water 406 and the warmed pretreated raw water 407 received from the third pipe 150 and converts the pretreated mixture 408 (the warmed pretreated raw water 406+the warmed pretreated raw water 407) into a mixture of water vapors and hot pretreated water 409. For heating the warmed pretreated raw water 406 and the warmed pretreated raw water 407 as the mixture 408, the third heat exchanger 700 may receive waste heat discharged by the power plant 1000. The third heat exchanger 700 (also known as the alternative thermal heat exchanger 700) may receive the waste heat in the form of steam 1002 discharged by the power plant 1000 via a first steam line 162 to facilitate the heating of the mixture of the warmed pretreated raw water 406 and the warmed pretreated raw water 407. Further, the third heat exchanger 700 is also capable of accepting waste heat from other sources via inlet pipe 702 and outlet pipe 704, such as, industrial waste heat and hot compressor cooling water inputs. Thus, the mixture of water vapors and hot pretreated water 409 produced inside the third heat exchanger 700 using all available thermal waste sources is conveyed to the fourth heat exchanger 800 via an inlet conduit 164.

The fourth heat exchanger 800 may again be a shell and tube type heat exchanger adapted to receive the mixture of water vapors and hot pretreated water 409 from the third heat exchanger 700 and facilitates a conversion of the mixture 409 into potable water 200 and a thermo-brine 802 by enabling cooling of the mixture of water vapors and hot pretreated water 409 by the LNG 302, saline ice 908 and pretreated raw water 405. To facilitate the condensation of the water vapors and cooling of the hot pretreated water received from the third heat exchanger 700, the supply of liquid natural gas 302, received from the source 300 via the second conduit 116, flows through a first tube 166 of the fourth heat exchanger 800, and, in so doing, gets converted into the gaseous natural gas 304. The gaseous natural gas 304 exits the fourth heat exchanger 800 and flows to the natural gas manifold 1100 via a second flow line 170. Further, the fourth heat exchanger 800 may include a second tube 172 to facilitate a flow of a mixture the pretreated raw water 405 and the saline ice melt 908 received via the second pipe 141. The pretreated raw water 405 and the saline ice melt 908 flowing through the second tube 172 also facilitates in condensing the water vapors of the mixture of water vapors and hot pretreated water 409 into the potable water 200. Also, the second tube 172 (i.e. the fourth heat exchanger 800) may be connected to the third outlet pipe 160 to deliver the warm pretreated raw water 406 to the third pipe 150, and subsequently to the third heat exchanger 700. Further, the potable water 200 so collected is discharged via outlet conduit 808 from the fourth heat exchanger 800, while the thermo-brine 802 collected at the bottom of the shell is delivered to the fifth heat exchanger 900 via a second brine conduit 174.

The fifth heat exchanger 900 is adapted to facilitate in forming a dense brine 902 by cooling and chilling the thermo-brine 802 received from the fourth heat exchanger 800 and cryo-brine 410 received from the first heat exchanger 500. The fifth heat exchanger 900 is fluidly connected to the first heat exchanger 500 and the fourth heat exchanger 800, respectively, via the first brine conduit 138 and the second brine conduit 174 to receive the cryo-brine 410 and the thermo-brine 802. Further, the fifth heat exchanger 900 may be fluidly connected to the LNG source 300 via the third conduit 118 to receive the supply of liquid natural gas 302 from the source 300. The cryo-brine 410 and thermo-brine 802 may together be referred to as a brine mixture. The fifth heat exchanger 900 may facilitate a heat transfer between the liquid natural gas 302 and the brine mixture to facilitate a formation of the saline ice 904 and a formation of the dense brine 902 inside the fifth heat exchanger 900. For so doing, referring to FIG. 3, the fifth heat exchanger 900 may include a shell 180 having a first chamber 182 to receive the brine mixture and a tube 186 disposed inside the shell 180 and adapted to receive the supply of liquid natural gas 302 via the third conduit 118 and facilitates a flow of liquid natural gas 302 through the fifth heat exchanger 900. As the supply of liquid natural gas 302 flows through the tube 186, the heat from the brine mixture is transferred to the liquid natural gas 302, converting the liquid natural gas 302 to the gaseous natural gas 304. In so doing, a less dense layer of saline ice 904 is formed on an outer surface of the tube 186, also resulting into formation of the very dense brine 902 having high concentration of minerals, which gets collected at the bottom of the shell 180. In an embodiment, the fifth heat exchanger 900 may include a plurality of baffle plates 187 to facilitate a separation of the dense brine 902 from saline ice 904.

Further, some of the saline ice 904 formed on the surface of the tube 186 may get separated from the tube 186 and moves to an upper surface 181 of a saline ice pooling area 903. Further, the LNG 302 flowing through the tube 186 may be pulsed to insure no continuous freeze up within the fifth heat exchanger 900. The LNG 302 flowing through the first heat exchanger 500 and the fourth heat exchanger 800 may also be pulsed. This method of pulsing (sometimes through redundant tube bundles) is possible without gaseous natural gas 304 interruption to natural gas downstream users because the natural gas manifold 1100 acts as a gaseous natural gas surge tank. Moreover, the less dense saline ice 904 rises to the upper surface 181 of the brine mixture, is skimmed off and flows to a second chamber 190 of the shell 180. Subsequently, the saline ice 904 is pumped to the second heat exchanger 600 via the fourth pipe 152. In an embodiment, the fifth heat exchanger 900 may include a slurry pump to pump the saline ice 904 and dilute ice pool surface 903 from the fifth heat exchanger 900 to the second heat exchanger 600 via the fourth pipe 152. Also, the fifth heat exchanger 900 may receive the saline ice melt 910 via the second outlet pipe 158. The saline ice melt 910 received from the second heat exchanger 600 may facilitate a shearing and shallow splashing of the saline ice 904 and the saline ice pooling area 903, and a flow of the saline ice 904 from the upper surface 181 to the second chamber 190 of the shell 180. Further, gaseous natural gas 304 from the fifth heat exchanger 900 flows to the natural gas manifold 1000 via a third flow line 192. Further, the fifth heat exchanger 900 may include an outlet 194 to facilitate a removal of the dense brine 902 from the fifth heat exchanger 900. The dense brine 902 so removed from the fifth heat exchanger 900 may be dewatered, compressed and/or dried to form brine cake, which can be utilized for mining of extracting minerals, salts and elements. In some embodiments, the fifth heat exchanger 900 (FIG. 3) may include the plurality of baffle plates 187 disposed inside the shell 180 and the located between the LNG tube 192 and the bottom portion of shell 180. The baffles plates 187 may cause a generation of downward eddies inside the shell 180, thereby facilitating removal of dense brine 902 from the fifth heat exchanger 900 through the outlet 194.

A method or process for converting the raw water 400 into the potable water 200 is explained now. Initially, the first heat exchanger 500 receives the raw water 401 from a raw water source and the supply of liquid natural gas 302 from the source 300. As the LNG 302 flows through the tube 130, a lesser portion of the raw water 401 that is in contact with the tube 130 gets converted into the brine due to separation of ice formed on the tube 130, resulting into formation of the cryo-brine 410 at the bottom of the shell 120, and formation of the pretreated raw water 403 containing ice water 402 proximate to the top portion of the shell 120. The pretreated raw water 403 is discharged from the first heat exchanger 500 via the first pipe 140, while the cryo-brine 410 exits the first heat exchanger 500 and flows to the fifth heat exchanger 900 via the first brine conduit 138. Upon exiting the first heat exchanger 500, the pretreated raw water 404 enters the second heat exchanger 600 via the first pipe 140, while the pretreated raw water 405 flows to the fourth heat exchanger 800 via the second pipe 141. The pretreated raw water 404 is preheated inside the second heat exchanger 600 by the steam/feedwater 1004 received from the third heat exchanger 700 via the second steam inlet line 142, and exits the second heat exchanger 600 as the warmed pretreated raw water 407. Due to the heat exchange between the steam/feedwater 1004 and the pretreated raw water 404, the steam/feedwater 1004 may get condensed and gets converted into the feedwater 1006 which exits the second heat exchanger 600 as feedwater 1006 and returns and flows to the power plant 1000 via the first steam outlet line 144. Further, the bypass valve 907 may regulate the flow of the saline ice 904 through the pipe 151 to third pipe 150 to control a net condensation of steam/feedwater 1006 returned to the power plant 1000, hence adjusting a net vacuum of the second heat exchanger 600.

Subsequently, the hot pretreated raw water 407 enters the third pipe 150. Also, the third pipe 150 receives the warmed pretreated raw water 406 from the fourth heat exchanger 800 via the third outlet pipe 160, which gets mixed with the warmed pretreated raw water 407. Accordingly, the pretreated mixture 408 of the warmed pretreated raw water 406 and the warmed pretreated raw water 407 enters the third heat exchanger 700 via the third pipe 150. The third heat exchanger 700 facilitates a heating of the pretreated mixture 408 by using a waste heat received from the power plant 1000 and from alternative waste heat available flowing from the inlet pipe 702 via the outlet pipe 704. In an embodiment, the third heat exchanger 700 may receive the steam 1002 discharged by the power plant 1000 and other available waste heat to heat pretreated mixture 408. It may be appreciated that the pretreated mixture 408 of the warmed pretreated raw water 406 and the warmed pretreated raw water 407 may be heated to such a temperature that the mixture of water vapors and hot pretreated water 409 is formed. In an embodiment, the water vapors may be in the form of a saturated steam.

Figure 4:
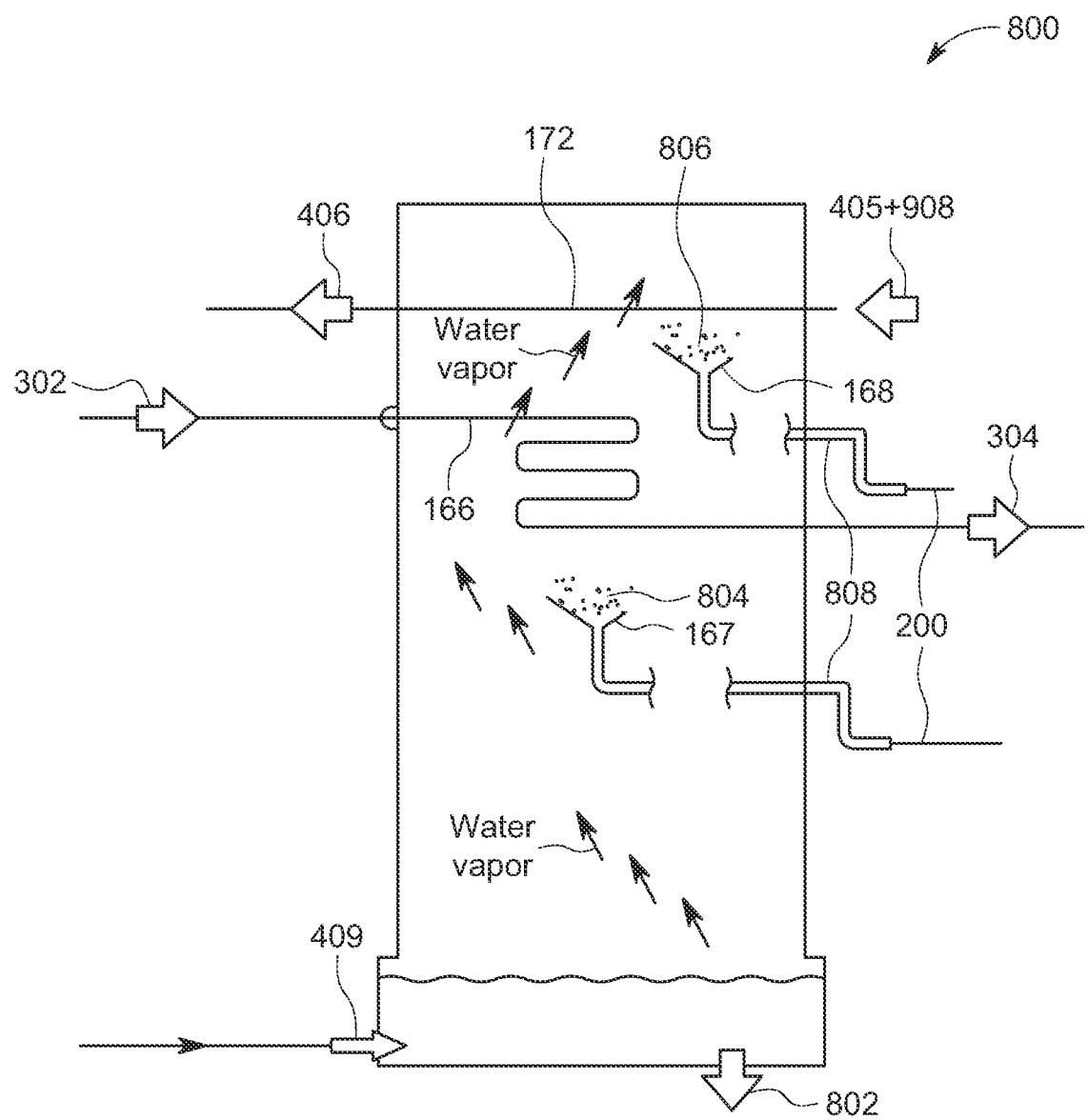
FIG. 4 illustrates a schematic view of a fourth heat exchanger of the desalination system of FIG. 1 depicting an internal arrangement of the fourth heat exchanger, in accordance with an embodiment of the disclosure.

Subsequently, the mixture of water vapors and hot pretreated water 409 is pumped to the fourth heat exchanger 800 via the inlet conduit 164. The mixture of water vapors and hot pretreated water 409 may be cooled by the supply of liquid natural gas 302 flowing through the first tube 166. In so doing, at least a portion of the water vapors may condense to form a condensate 804 that may be collected inside a first pan 167 (shown in FIG. 4) disposed inside the fourth heat exchanger 800, while the thickening hot pretreated water gets cooled to form the thermo-brine 802. In an embodiment, a remaining portion of the water vapors may contact the second tube 172 and get condensed into a condensate 806 due to the transfer of heat to the pretreated raw water 405 and the saline ice melt 908 flowing through the second tube 172. The condensate 806, so formed, may be collected into a second pan 168 (shown in FIG. 4) and collectively, along with condensate 804 via pan 167, move outside the fourth heat exchanger 800 via an outlet pipe 808 as the potable water 200 for further use. In this manner, the desalination system 100 facilitates in extracting potable water 200 from dilute pretreated raw water 403 and from dilute saline ice 904, while minimizing a consumption of energy. Further, the thermo-brine 802 is pumped to the fifth heat exchanger 900 via the second brine conduit 174.

Figure 3:
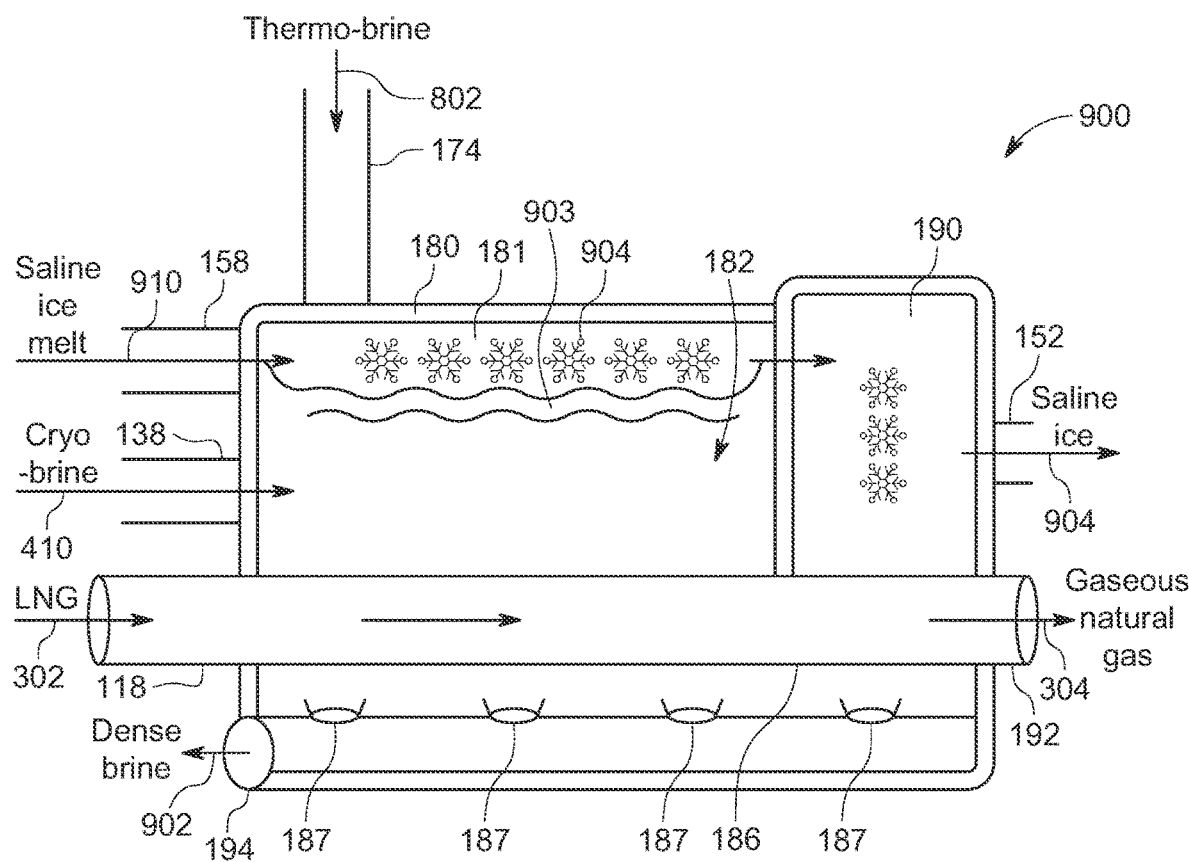
FIG. 3 illustrates a schematic view of a fifth heat exchanger of the desalination system of FIG. 1 depicting an internal arrangement of the fifth heat exchanger, in accordance with an embodiment of the disclosure.

Inside the FIG. 3 fifth heat exchanger 900, the thermo-brine 802 received from the fourth heat exchanger 800 and the cryo-brine 410 received from the first heat exchanger 500 are cooled by the supply of liquid natural gas 302 flowing through the tube 186. In so doing, a layer of saline ice 904 is formed along the outer surface of the tube 186, also resulting into a formation of and separation of the dense brine 902 from the mixture of thermo-brine 802 and the cryo-brine 410. The dense brine 902, so formed, includes the heavy concentration of mineral and settles through baffling 187 at the bottom of the fifth heat exchanger 900. The dense brine 902 is extracted from the fifth heat exchanger 900 via the outlet 194 and dewatered, compressed and/or dried to form a brine cake. Accordingly, the desalination system 100 facilitates in reducing a discharge amount of the brine to an ambient waste area, such as back to the ocean or groundwater injection. Also, the saline ice 904 formed on the tube 186 may get dislodged from the tube 186 and may move to the upper surface of the brine mixture (thermo-brine 802+cryo-brine 410). Further, the fifth heat exchanger 900 receives the saline ice melt 910 from the second heat exchanger 600 via the second outlet pipe 158. The saline ice melt 910 facilitates in shearing and splashing of the saline ice pooling area 903 and the surface saline ice 904 above the tube 186, and also facilitates in moving the saline ice 904 to the second chamber 190.

Moreover, due to the transfer of heat to the supply of liquid natural gas 302 from the brine mixture (thermo-brine 802+cryo-brine 410), the liquid natural gas 302 is converted into the gaseous natural gas 304 as the supply of liquid natural gas 302 flows through the tube 186. Subsequently, the gaseous natural gas 304 flows to the natural gas manifold 1100 via the third flow line 192, capturing latent heat of vaporization from the fifth heat exchanger 900, combining with the fourth heat exchanger 800 and the first heat exchanger 500 captured latent heat in the process. In an embodiment, the natural gas manifold 1100 may be connected to the power plant 1000 to provide a compressed or LNG-pressurized gaseous natural gas 306 as fuel to the power plant 1000. In some implementations, a compressor 1200 may facilitate in increasing a pressure of the gaseous natural gas 306 being delivered to the power plant 1000 from the natural gas manifold 1100. Importantly, in some embodiments, the capture of latent heat of vaporization by pressurized liquid natural gas results in change of state from liquid natural gas to gaseous natural gas, causing 600 units of systemic natural gas expansion to per 1 unit of liquid natural gas. Thus, sufficient initial LNG-pressurization causes universal natural gas expansion which alone may eliminate less inefficient natural gas compressor 1200 and optional natural gas compression for domestic or industrial use. In some embodiment, the natural gas manifold 1100 may also supply pre-warmed gaseous natural gas 308 for domestic or other usages. In some embodiments, it may be appreciated that the use of liquid natural gas 302 for cooling and/or condensation may require the liquid natural gas 302 be fed into redundant tube bundles via pulsed intervals so that the fluids in heat exchangers 500, 800, 900 will not steadily freeze up.

The first heat exchanger 500 facilitates a cryo-pretreatment of the raw water 401 using liquid natural gas 302, thereby reducing much of the harsh inlet scaling and corrosion chemicals dispensed in industry-typical raw water treatment which only adds to the present-day anti-environmental brine soup sent back into the ocean. Also, the second heat exchanger 600 has an upstream variable saline ice bypass pipe 151 with the valve 907 managing pre-second heat exchanger saline ice flow. This allows condenser vacuum range control of the steam/feedwater backpressure for the power plant 1000. Managing the condenser vacuum can eliminate summertime power plant derating and avoid dangerous wintertime hyper-cooled, back-end steam leaving the CCGT/HRSG turbine.

Figure 5:
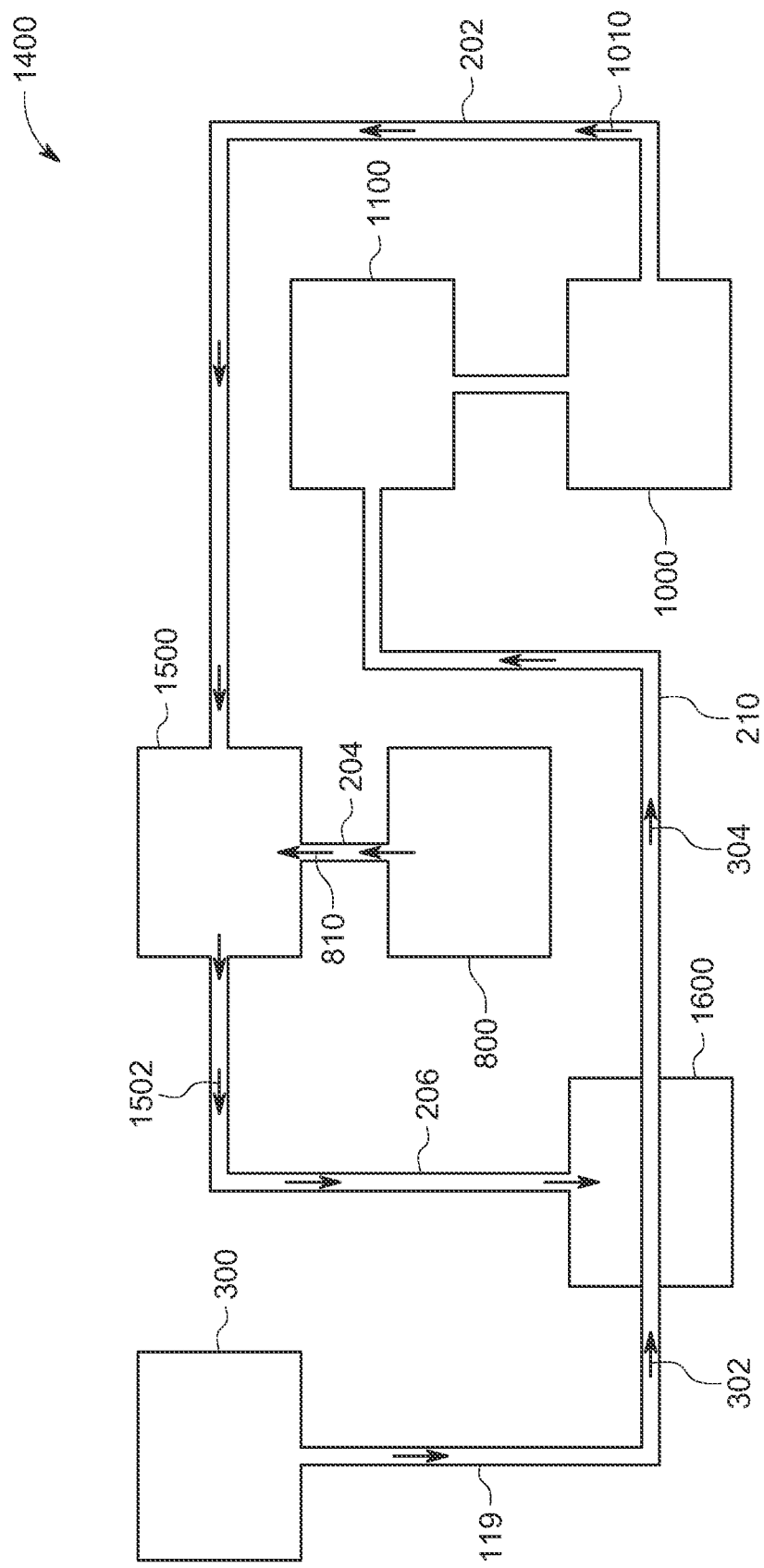
FIG. 5 illustrates a schematic view of an option #1 carbon capture system of the desalination system of FIG. 1, in accordance with an embodiment of the disclosure.

Additionally, the desalination system 100 may include a carbon capture system 1400 (as shown in FIG. 5) to capture carbon dioxide present in a flue gas 1010 discharged by the power plant 1000 and a non-condensable gas 810 discharged by the fourth heat exchanger 800. As shown in FIG. 5, the carbon capture system 1400 may include an $CO_2$ gas isolation apparatus 1500 and a $CO_2$ gas distillation apparatus 1600. The $CO_2$ gas isolation apparatus 1500 is adapted to identify the gaseous carbon di-oxide present in the flue gas 1010 and the non-condensable gas 810, and isolates/separates gaseous carbon dioxide 1502 from the flue gas 1010 and the non-condensable gas 810. The $CO_2$ gas isolation apparatus 1500 receives the flue gas 1010 from the power plant 1000 via a first carbon pipe 202, and receives the non-condensable gas 810 from the fourth heat exchanger 800 via a second carbon pipe 204. Further, the gaseous carbon dioxide 1502, separated by the $CO_2$ gas isolation apparatus 1500, is directed/provided to the $CO_2$ gas distillation apparatus 1600 via a third carbon pipe 206. The distillation apparatus 1600 is adapted to receive the LNG 302 from the LNG source 300 via a fourth conduit 119 and coverts the gaseous carbon dioxide 1502 into depositional dry ice by enabling a heat transfer between the LNG 302 and the gaseous carbon-dioxide 1502. Gaseous natural gas 304 exits the distillation apparatus 1600 and moves to the natural gas manifold 1100 via a pipe 210.

Figure 6:
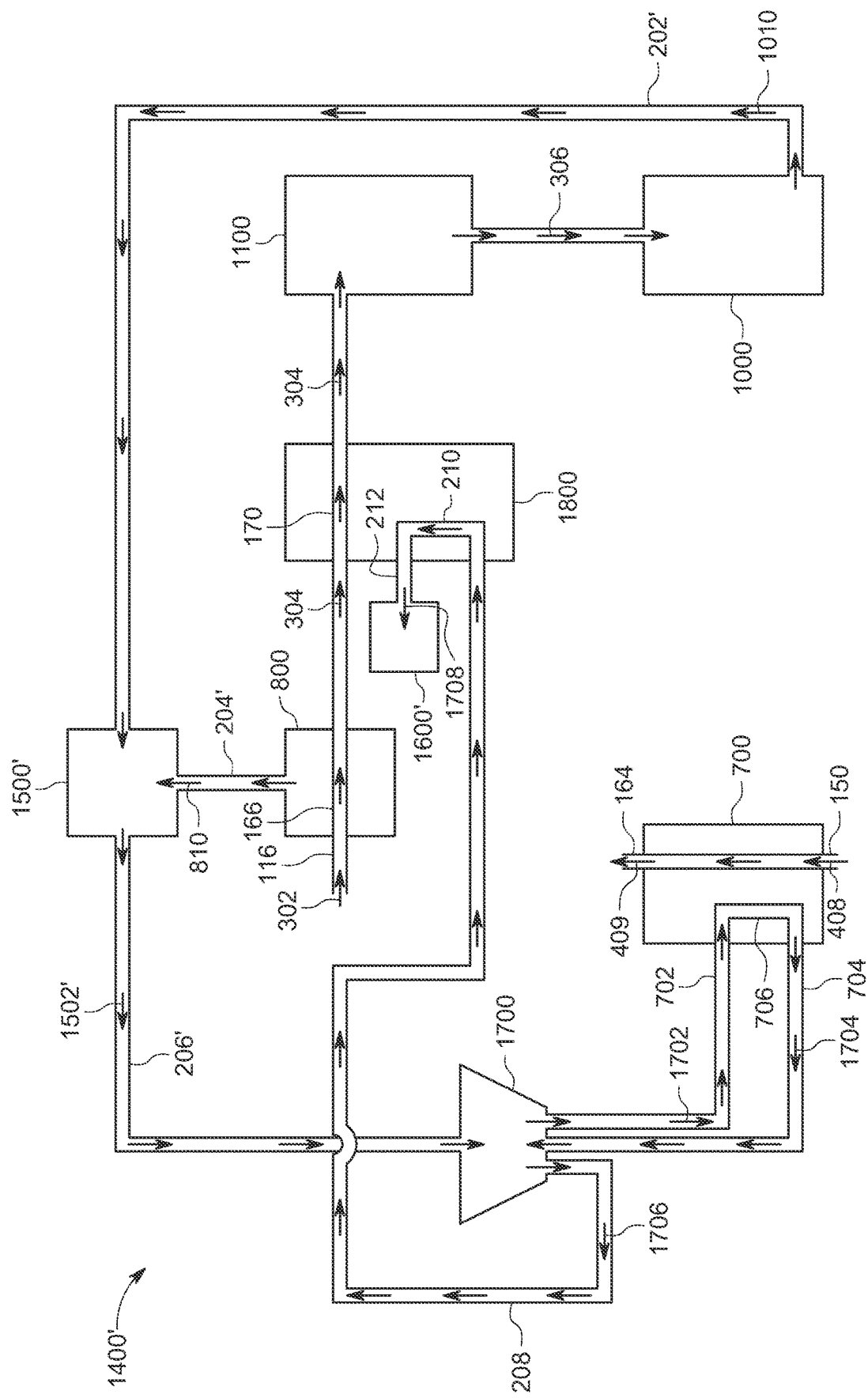
FIG. 6 illustrates a schematic view of an option #2 carbon capture system of the desalination system of FIG. 1, in accordance with an embodiment of the disclosure.

Referring to FIG. 6, a second, carbon capture system 1400' is shown according to an embodiment of the disclosure. As shown in FIG. 6, the carbon capture system 1400' may include an $CO_2$ gas isolation apparatus 1500', a $CO_2$ gas compressor 1700, a $CO_2$ storage 1600', and a $CO_2$ heat exchanger 1800 (hereinafter referred to as sixth heat exchanger 1800). The $CO_2$ gas isolation apparatus 1500' is adapted to identify the gaseous carbon di-oxide present in the flue gas 1010 and the non-condensable gas 810, and isolates/separates gaseous carbon dioxide 1502' from the flue gas 1010 and the non-condensable gas 810. The isolation apparatus 1500' receives the flue gas 1010 from the power plant 1000 via a first carbon pipe 202', and receives the non-condensable gas 810 from the fourth heat exchanger 800 via a second carbon pipe 204'. Further, the gaseous carbon dioxide 1502', separated by the $CO_2$ gas isolation apparatus 1500', is directed/provided to the $CO_2$ gas compressor 1700 via a third carbon pipe 206'.

The $CO_2$ gas compressor 1700 is adapted to compress the gaseous carbon dioxide 1502' and converts the gaseous carbon dioxide 1502' into a hot liquid carbon dioxide 1706. Further, the compressor 1700 may include a water jacket though which the water circulates to absorb a heat produced during the compression of gaseous carbon dioxide 1502'. The compressor 1700 is connected to the third heat exchanger 700 via the pipe 702 to provide a flow of a heated water 1702 from the compressor 1700 to the third heat exchanger 700. The heated water 1702 flows through a pipe 706 inside the third heat exchanger 700, and exchanges heat with the pretreated mixture 408, facilitating the conversion of the pre-treated mixture 408 into a mixture of water vapors and hot pretreated water 409. Due to the transfer of heat from the heated water 1702 to the pretreated mixture 408, the heated water 1702 cools down, and exits the third heat exchanger 700 as a cooled water 1704. The cooled water 1704 flows to the water jacket of the compressor 1700 via the pipe 704 to facilitate the cooling of the compressor 1700.

Moreover, the hot liquid carbon dioxide 1706 discharged by the compressor 1700 flows to the sixth heat exchanger 1800 via a fourth carbon conduit 208. The sixth heat exchanger 1800 enables a heat exchange between the hot liquid carbon dioxide 1706 received from the compressor 1700 and the gaseous natural gas 304 discharged by the fourth heat exchanger 800. For so doing, the sixth heat exchanger 1800 includes a fifth conduit 210 disposed inside the sixth heat exchanger 1800 and connected to the fourth conduit 208 for receiving the hot liquid carbon dioxide 1706. Also, to heat a flow of the gaseous natural gas 304 flowing through the sixth heat exchanger 1800, a portion of the second flow line 170 passes through the sixth heat exchanger 1800. Due to the heat exchange between the hot liquid carbon dioxide 1706 and the gaseous natural gas 304, the hot liquid carbon dioxide 1706 gets cooled down, and leaves the sixth heat exchanger 1800 as cooled liquid carbon dioxide 1708 via a sixth carbon conduit 212, while the gaseous natural gas 304 gains heat and flows to the natural gas manifold 1100. The sixth carbon conduit 212 may be connected to the storage tank 1600' for storing the liquid carbon dioxide 1708 for further usage.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions such as various industrial waste heats flowing through pipes 702, 704 contributing to the net temperature of third heat exchanger 700, than those explicitly described above are also contemplated as may be set forth in some of the appended claims. Although specific terms are employed herein, they are used in a generic and descriptive sense only and not for purposes of limitation.

What is claimed is:

1. A desalination system for extracting a potable water from a raw water, the desalination system comprising:
    a source of liquid natural gas;
    a first heat exchanger adapted to receive the liquid natural gas from the source and facilitates a heat transfer between the liquid natural gas and the raw water to convert the raw water into a pretreated raw water having at least a minority of ice water and a cryo-brine;
    a second heat exchanger arranged to heat at least a portion of the pretreated raw water exiting the first heat exchanger and converts the portion of pretreated raw water into a warmed pretreated raw water;
    a third heat exchanger fluidly connected to the second heat exchanger and adapted to receive the warmed pretreated raw water discharged by the second heat exchanger to facilitate a heating of the warmed pretreated raw water to convert the warmed pretreated raw water into a mixture of water vapors and hot pretreated water;
    a fourth heat exchanger configured to receive the liquid natural gas from the source and cool pretreated raw water discharged from the first heat exchanger and the mixture of water vapors and hot pretreated water from the third heat exchanger, wherein the fourth heat exchanger facilitates a heat transfer between the mixture of water vapors and hot pretreated water, cool pretreated raw water received from the first heat exchanger and the liquid natural gas to facilitate a condensation of the water vapors into the potable water and a conversion of the hot pretreated water into a thermo-brine; and
    a fifth heat exchanger fluidly connected to the fourth heat exchanger and the first heat exchanger to, respectively, receive the thermo-brine and the cryo-brine, and forms a dense brine and a saline ice by cooling a mixture of the thermo-brine and the cryo-brine by the liquid natural gas received from the source.

2. The desalination system of claim 1, wherein the second heat exchanger facilitates the preheating of the pretreated raw water by facilitating a heat exchange between a steam discharged by the third heat exchanger and the pretreated raw water received from the first heat exchanger.

3. The desalination system of claim 1, wherein the third heat exchanger facilitates a heating of the warmed pretreated raw water received from the second heat exchanger and the fourth heat exchanger by facilitating a heat transfer between the warmed pretreated raw water and a steam discharged by a combined cycle power plant.

4. The desalination system of claim 1, wherein at least a portion of the saline ice from the fifth heat exchanger flows to the second heat exchanger, wherein the second heat exchanger facilitates a melting of the saline ice received from the fifth heat exchanger and converts the saline ice into a saline ice melt.

5. The desalination system of claim 1, wherein a portion of the saline ice discharged from the fifth heat exchanger is diverted to the third heat exchanger.

6. The desalination system of claim 4, wherein at least a portion of the saline ice melt discharged by the second heat exchanger is diverted to the fourth heat exchanger to facilitate a condensation of the water vapors into the potable water.

7. The desalination system of claim 6, wherein the portion of the saline ice melt being diverted to the fourth heat exchanger is mixed with a portion of the pretreated raw water exiting the first heat exchanger to form the cool pretreated raw water, wherein the cool pretreated raw water facilitates the condensation of the water vapors into the potable water.

8. The desalination system of claim 4, wherein at least a portion of the saline ice melt discharged by the second heat exchanger is diverted to the fifth heat exchanger.

9. The desalination system of claim 1 further including a natural gas manifold in fluid communication with the first heat exchanger, the fourth heat exchanger and the fifth heat exchanger and adapted to receive volatilized gaseous natural gas from the first heat exchanger, the fourth heat exchanger and the fifth heat exchanger.

10. The desalination system of claim 1 further including
a compressor adapted to receive gaseous carbon dioxide, wherein the compressor compresses the gaseous carbon dioxide into a hot liquid carbon dioxide, and
a sixth heat exchanger adapted to receive the hot liquid carbon dioxide from the compressor and a gaseous natural gas exiting the fourth heat exchanger and facilitates a cooling of the hot liquid carbon dioxide by facilitating a heat exchange between the hot liquid carbon dioxide and the gaseous natural gas.

11. The desalination system of claim 1 further including an apparatus adapted to receive gaseous carbon dioxide and the liquid natural gas from the source, wherein the apparatus facilitates a conversion of the gaseous carbon dioxide into a dry ice by enabling a heat exchange between the gaseous carbon dioxide and the liquid natural gas.

12. A method for extracting a potable water from a raw water, the method comprising:
cooling, by a first heat exchanger, at least a portion of the raw water using liquid natural gas and converting at least a portion of the raw water into a pretreated raw water having ice water and a cryo-brine;
pre-heating, by the second heat exchanger, at least a portion of the pretreated raw water discharged by the first heat exchanger and converting the portion of the pretreated raw water into a warmed pretreated raw water;
heating, by a third heat exchanger, the warmed pretreated raw water discharged by the second heat exchanger by using a waste heat of a combined cycle power plant to convert the warmed pretreated raw water into a mixture of water vapors and hot pretreated water;
cooling, by a fourth heat exchanger, the mixture of water vapors and hot pretreated water by utilizing liquid natural gas and cool pretreated raw water from the first heat exchanger, wherein the water vapors are condensed into the potable water and the hot pretreated water is converted into a thermo-brine in response to the cooling of the mixture of water vapors and hot pretreated water; and
cooling, by the fifth heat exchanger, the thermo-brine and the cryo-brine by liquid natural gas, wherein the thermo-brine and the cryo-brine are converted into a saline ice and a dense brine in response to the cryo cooling of the thermo-brine and the cryo-brine.

13. The method of claim 12, wherein the second heat exchanger preheats the at least a portion of the pretreated raw water by utilizing a steam or feedwater received from the third heat exchanger.

14. The method of claim 12, wherein the saline ice from the fifth heat exchanger flows to the second heat exchanger and the second heat exchanger facilitates a melting of the saline ice and converts the saline ice into a saline ice melt.

15. The method of claim 14, wherein at least a portion of the saline ice melt discharged by the second heat exchanger is diverted to the fourth heat exchanger to facilitate a condensation of the water vapors into the potable water.

16. The method of claim 15, wherein the portion of the saline ice melt from the second heat exchanger being diverted to the fourth heat exchanger is mixed with a portion of the pretreated raw water exiting the first heat exchanger to form the cool pretreated raw water, wherein the cool pretreated raw water facilitates the condensation of the water vapors into the potable water.

17. The method of claim 14, wherein at least a portion of the saline ice melt discharged by the second heat exchanger is diverted to the fifth heat exchanger.

18. The method of claim 12, wherein the liquid natural gas is provided to the first heat exchanger, the fourth heat exchanger and the fifth heat exchanger at pulsating intervals.

19. The method of claim 12 further including
compressing, by a compressor, gaseous carbon dioxide into a hot liquid carbon dioxide, and
cooling, by a sixth heat exchanger, the hot liquid carbon dioxide by facilitating a heat exchange between the hot liquid carbon dioxide and a gaseous natural gas received from the fourth heat exchanger.

20. The method of claim 12 further including
converting, by an apparatus, gaseous carbon dioxide into a dry ice by enabling a heat exchange between the gaseous carbon dioxide and a liquid natural gas.

\* \* \* \* \*